(12) United States Patent
Alter et al.

(10) Patent No.: US 7,737,965 B2
(45) Date of Patent: Jun. 15, 2010

(54) HANDHELD SYNTHETIC VISION DEVICE

(75) Inventors: Keith Alter, Issaquah, WA (US); Andrew Kevin Barrows, Foster City, CA (US); Chad Jennings, San Mateo, CA (US)

(73) Assignee: Honeywell International Inc., Morristown, NJ (US)

( * ) Notice: Subject to any disclaimer, the term of this patent is extended or adjusted under 35 U.S.C. 154(b) by 1406 days.

(21) Appl. No.: 11/160,115

(22) Filed: Jun. 9, 2005

(65) Prior Publication Data

US 2009/0293012 A1   Nov. 26, 2009

(51) Int. Cl.
   *G06T 15/00*   (2006.01)
(52) U.S. Cl. .................. 345/419; 345/581; 715/764; 715/792; 701/207; 701/208; 701/216
(58) Field of Classification Search .................. 345/419, 345/581; 715/764, 792; 701/207, 208, 216
   See application file for complete search history.

(56) References Cited

U.S. PATENT DOCUMENTS

| | | | |
|---|---|---|---|
| 2,784,307 A | 3/1957 | Burton | |
| 3,605,083 A | 9/1971 | Kramer | |
| 3,643,213 A | 2/1972 | Yurasek et al. | |
| 3,711,826 A | 1/1973 | La Russa | |
| 3,784,969 A | 1/1974 | Wilckens et al. | |
| 3,786,505 A | 1/1974 | Rennie | |
| 3,789,356 A | 1/1974 | Harenberg, Jr. et al. | |
| 3,843,554 A | 10/1974 | Aykan et al. | |
| 4,057,782 A | 11/1977 | Muller | |
| 4,316,252 A | 2/1982 | Cooper | |
| 4,368,517 A | 1/1983 | Lovering | |
| 4,419,079 A | 12/1983 | Georges et al. | |
| 4,419,731 A | 12/1983 | Puffett et al. | |
| 4,660,157 A | 4/1987 | Beckwith et al. | |
| 4,825,374 A | 4/1989 | King et al. | |
| 4,999,780 A | 3/1991 | Mitchell | |
| 5,047,942 A | 9/1991 | Middleton et al. | |
| 5,101,357 A | 3/1992 | Tempelhof et al. | |
| 5,115,398 A | 5/1992 | De Jong et al. | |
| 5,343,395 A | 8/1994 | Watts | |
| 5,566,073 A | 10/1996 | Margolin | |
| 5,706,195 A | 1/1998 | Corby | |
| 5,815,411 A * | 9/1998 | Ellenby et al. | ............... 702/150 |

(Continued)

FOREIGN PATENT DOCUMENTS

EP   0399670   11/1990

OTHER PUBLICATIONS

W. Pasman, C. Woodward, "Implementation of an Augmented Reality System on a PDA", Proc. ISMAR 2003, Tokyo, Japan, Nov. 4-7, 2003.

(Continued)

*Primary Examiner*—Phu K Nguyen
(74) *Attorney, Agent, or Firm*—Ingrassia Fisher & Lorenz, P.C.

(57) ABSTRACT

A handheld synthetic vision system includes a display, a sensor suite and a computer all housed in a handheld unit. The system enhances normal vision by displaying to a user actual or digitally created visual scenes of objects and information that may or may not be perceptible to unaided human senses.

12 Claims, 12 Drawing Sheets

U.S. PATENT DOCUMENTS

| | | | |
|---|---|---|---|
| 5,904,724 A | | 5/1999 | Margolin |
| 6,031,545 A * | | 2/2000 | Ellenby et al. ............... 345/632 |
| 6,181,302 B1 | | 1/2001 | Lynde |
| 6,278,461 B1 * | | 8/2001 | Ellenby et al. ............... 345/427 |
| 6,307,556 B1 * | | 10/2001 | Ellenby et al. ............... 345/427 |
| 6,408,257 B1 | | 6/2002 | Harrington |
| 7,301,536 B2 * | | 11/2007 | Ellenby et al. ............... 345/419 |
| 7,446,768 B2 * | | 11/2008 | Satoh et al. ................. 345/427 |
| 2002/0039085 A1 | | 4/2002 | Ebersole |
| 2002/0167536 A1 | | 11/2002 | Valdes |
| 2002/0191003 A1 | | 12/2002 | Hobgood |
| 2002/0196202 A1 | | 12/2002 | Bastian |
| 2003/0014212 A1 | | 1/2003 | Ralston |
| 2003/0179218 A1 | | 9/2003 | Martins |
| 2003/0210228 A1 | | 11/2003 | Ebersole |
| 2003/0210832 A1 | | 11/2003 | Benton |
| 2004/0051680 A1 | | 3/2004 | Azuma |

OTHER PUBLICATIONS

KNS80 Integrated NAV System, Bendix/King, Apr. 1989.
1st Class Moving Map, Digital Sky, 2007.
GPS 100 AVD Personal Navigator, Garmin International, Inc., 1991.
U.S. GeoData Digital Line Graphs, U.S. Dept. of the Interior, 12 pages, Jun. 1993.
US GeoData Digital Elevation Models, U.S. Dept. of the Interior, 6 pages, Jun. 1993.
3 SpaceFastrak, Polhemus, Jan. 1994.
Buening, Tactical Mapping in Combat Aircraft, IEEE, 5 pages, 1998.
Gallant, "System revolutionizes surveying and navigation", EDN, pp. 31-42, Jan. 7, 1993.
Hard Drivin, Atari Games Corp., 1988.
Jacobs et al., "Fractal Image Compression Using Iterated Transforms: Applications to DTED", NCCOSC RDT&E Div., pp. 1122-1128, Oct. 11, 1992.
Magellan GPS Map 7000, Jan. 1999.
Patrick, et al., "ITARS Robust Demonstration System Integration", IEEE, pp. 83-87, 1988.
Raymer, et al., "Advanced Terrain Data Processor", IEEE, pp. 636-639, 1994.
"Steel Talons", Atari Games Corp., 1991.
Trimble Navigation TNL 1000 GPS Navigator 1992 Pilot Guide, 2 pages.
Lyons, et al., "Some Navigational Concepts for Remotely Piloted Vehicles", Agard Conference Proceedings, Aug. 1976 (15 pgs.).
Jeppensen Master Database, NavData (Dec. 2007).

* cited by examiner

A

B

C

D

HANDHELD SYNTHETIC VISION DEVICE

TECHNICAL FIELD

The invention relates generally to synthetic vision. In particular it relates to mobile synthetic vision devices with integrated navigation and motion sensing.

BACKGROUND

Synthetic vision and the closely related field of augmented reality encompass techniques and devices that give people an enhanced understanding of their surroundings through visual displays. Synthetic vision is an improvement over normal vision because it uses digital graphics to let people see things that would otherwise be invisible: a runway shrouded in fog, a buried pipeline, or a proposed building yet to be built.

A synthetic vision display may show: (I) actual real-time images such as live video or radar, (II) digitally created real-time images such as computer graphics, or combinations of (I) and (II). The combined presentation of actual and digitally created images on a display recreates the visible and invisible world as one travels through the air, on the earth's surface or under the sea. The combination of real and recreated views is sometimes called augmented reality. Here "synthetic vision" and "augmented reality" are used interchangeably.

Although the possibility of synthetic vision has been discussed for years, actual usable systems have only recently emerged as compact computing, attitude sensing and position sensing technology have matured. It has recently become possible, for example, to install a basic synthetic vision system in an aircraft although such systems are still in the development phase. A synthetic vision system in an aircraft cockpit may show pilots an accurate, three-dimensional view of desired flight paths, traffic, runways, terrain and obstacles near the aircraft. Research has shown that synthetic vision is easy for pilots to learn and use.

Azuma proposed an "optical see-through augmented reality modified-scale display" in US 2004/0051680 incorporated herein by reference. Azuma uses an optical approach where a user directly sees the real world through optics with graphics optically merged in. According to Azuma, "a person looking through a pair of binoculars might see various sights but not know what they are. A soldier could look through a pair of augmented binoculars and see electronic battlefield information directly superimposed upon his view of the real world (labels indicating hidden locations of enemy forces, land mines, locations of friendly forces, and the objective and the path to follow). A spectator in a stadium could see the names of the players on the floor and any relevant information attached to those players . . ." Lynde, U.S. Pat. No. 6,181,302 incorporated herein by reference, describes a similar augmented reality binocular system for marine applications.

The multimedia group at VTT Information Technology in Espoo, Finland has built an augmented reality system using a personal digital assistant as the display. See "Implementation of an Augmented Reality System on a PDA", W. Pasman and C. Woodward, Proc. ISMAR 2003, Tokyo, Japan, 4-7 Nov. 2003 incorporated herein by reference. The software runs in a client/server model and calculations are distributed between a server laptop and the PDA, using a WLAN link. Among other tasks, the software uses ARToolkit to track markers placed in the scene.

Surveylab Group Limited, Wellington, New Zealand offers the "IKE" line of rapid data capture devices. IKE combines GPS positioning, a digital camera and a laser range finder in a handheld device that records position-tagged digital photographs.

Ellenby proposed an "electro-optic vision system which exploits position and attitude" in U.S. Pat. No. 5,815,411 incorporated herein by reference. Ellenby mentions a planoptic approach to retrieving display data in which "the data store can have pre-programmed information regarding particular scenes that are of interest to a specific user. The position determining means and the attitude determining means control the pointer of the data store."

Conventional approaches to synthetic vision include undesirable limitations. Some of these are due to lack of computing power. Performing three dimensional graphics is computationally expensive. Each point in a graphics database—including vertices of all lines and polygons—must undergo a perspective transformation and projection using floating-point 4×4-matrix arithmetic. Additional integer math is required to actually draw polygons or lines on a screen. High bandwidth to video memory is required to achieve sufficient frame refresh rates. It has been estimated that a person using a calculator to perform all the computations in a complex scene could complete only two frames in his lifetime!

A new generation of 3D rendering chips, developed in response to demand from PC multimedia and gaming markets, are making sophisticated graphics possible at favorable price/performance levels. The power of a $10,000 graphics machine ten years ago can now be found on a single graphics chip or even incorporated into a microprocessor itself. In 1994 state-of-the-art mobile computing was represented by an 80486-based laptop with DOS as the operating system. Graphics chipsets had no 3D acceleration capabilities and display frame rates were limited to 12~15 Hz. By 1997 better operating systems and chipsets such as the GLiNT 500TX could achieve graphics frame rates as high as 20 Hz. Today, inexpensive mobile computers routinely incorporate microprocessors running as fast as 1 GHz, high resolution active matrix liquid crystal display screens and high resolution graphics with 20 Hz or greater update rate capability.

Another key problem in conventional synthetic vision is registration. Registration refers generally to displaying actual and digitally created objects in proper position relative to one another. Registration errors have many sources including inaccuracy in knowing one's position and, in some applications, inaccurate modeling of the curvature of the earth's surface. Some conventional synthetic vision systems use special fiduciary marks placed in a real scene to help overcome registration errors. A mark, such as a large letter "A" in a known location, can be recognized by image processing software. Since the mark's location is already known, digitally created objects can be aligned to it. The registration problem is especially acute for high magnification systems and for optical see-through devices.

Some conventional synthetic vision systems use a planoptic function approach to computer graphics. In this approach scene data for each possible position and attitude of a device is prerecorded in memory. The current position and attitude of the device are then used to select scenes from memory. Since it is desirable for the device to be able to display scenes corresponding to many different positions and attitudes, a large memory capacity is needed.

What is needed is a synthetic vision system that is small and light enough to be easily hand held for personal use or compactly mounted in a vehicle. Desirable attributes of such a system would include precise positioning, reduced registration errors and graphics rendering at 20 Hz or greater frame rates. Ideally the system should include compact attitude and heading sensing devices.

In addition it would be desirable to extend synthetic vision to include display of actual and/or digitally created scenes from arbitrary view points. For example, it would be useful for a construction engineer to be able to see a proposed building or a buried water pipe from a variety of perspectives: his current location, from overhead, from 45 degrees off to one side, etc.

It would also be desirable for the system to use a modern graphics rendering scheme in which data is culled from a database of objects according to their spatial locations and the extent of a computed view frustum. Culling allows the computer to quickly identify large blocks of data that can be ignored for a particular scene. In contrast to a planoptic approach, objects need only appear in a database once.

SUMMARY

According to an aspect of the invention a synthetic vision system includes a display, a sensor suite and a computer all housed in a handheld unit. The display is in communication with the computer and shows actual or digitally created scenes. The sensor suite comprises position and attitude sensors in communication with the computer and the computer uses position and attitude data reported by the sensor suite to calculate a view frustum and renders in three dimensional perspective on the display stored objects in a database that lie wholly or partially within the frustum.

According to an aspect of the invention a synthetic vision devices comprises a display, a position sensor and an attitude sensor each in communication with a computer, wherein the computer executes a software routine comprising the steps of: loading geospatial data into memory and georegistering it to a common reference frame, gathering and processing user inputs, reading measurements from navigation and tracking sensors, combining measurements into a filtered estimate of user state, updating scene content data, calculating positions and orientations of graphics viewpoints based on updated state data, and, drawing an updated graphic scene to video hardware based on updated state data.

According to an aspect of the invention a synthetic vision system includes a display, a position sensor and an attitude sensor each in communication with a computer wherein the position sensor is a WAAS enabled GPS receiver and the attitude sensor comprises gyroscopic rate sensors or accelerometers.

BRIEF DESCRIPTION OF THE DRAWINGS

The drawings are heuristic for clarity. The foregoing and other features, aspects and advantages of the invention will become better understood with regard to the following descriptions, appended claims and accompanying drawings in which:

DETAILED DESCRIPTION

Figure 1:
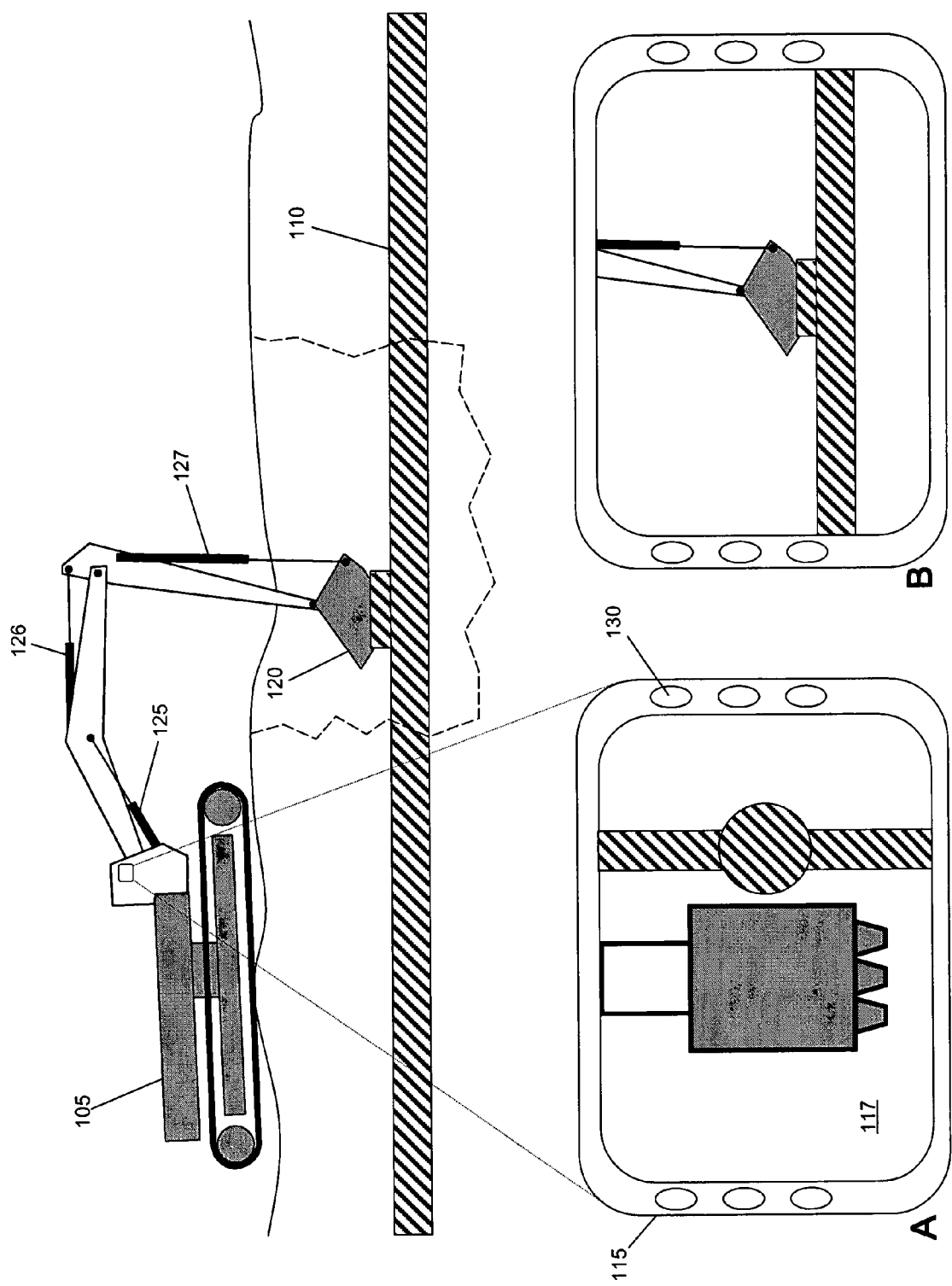
FIG. 1 shows a synthetic vision device used in a construction application to visualize the spatial relationship between a piece of machinery and an underground object.

Synthetic vision is an improvement upon natural vision. It helps one see objects and information that would otherwise be imperceptible. According to an aspect of the invention, a person holding a handheld synthetic vision device is able to aim it in any direction and see real world objects in that direction displayed on its screen even when those objects are hidden by darkness, fog or other obstructions. Further, the synthetic vision device may display information pertaining to displayed objects. For example, the voltage on a wire, the weight of a vehicle or name of the owner of a shipping container might all be displayed near their respective objects.

According to an aspect of the invention, a synthetic vision device may display scenes as viewed from perspectives other than that of the person holding the device. The user of the device may select a top-down map view, a side view or a view from an arbitrary viewpoint. In this way the user can look at objects from all sides without having to personally move around the objects.

The fundamental features of a synthetic vision device are therefore that it has a means of determining its position (all but the simplest synthetic vision devices also include a means of determining spatial orientation), that it has a graphics display and that it has access to information about objects that are shown on its display. The information may be the size, shape and position of objects, but could also include additional parameters of interest such as temperature, radioactivity, price or any number of other possible attributes.

Objects shown on a synthetic vision device may be actual video images, digitally created computer graphics, or a combination of both. The objects may correspond to items in the real world, such as a battle tank, or they may be only virtual objects that do not really exist, such as a simulated battle tank. A person driving a car in an empty parking lot could use a synthetic vision system to play a game of bumper cars with simulated cars shown on the synthetic vision display without running the risk of actual collision damage. A soldier in a tank could use a synthetic vision display to visualize other real tanks and their locations relative to enemy positions without having to look outside.

It is impossible to list every conceivable application of synthetic vision because vision encompasses a vast spectrum of human activities and perception. However, it is possible to describe an actual synthetic vision system. An aspect of the invention includes a real, handheld synthetic vision system.

A synthetic vision system, according to an aspect of the invention, has the ability to display actual video images, digitally created graphic images or combinations of the two. According to other aspects of the invention, the system may show scenes from egocentric (i.e. centered on the user) or exocentric (i.e. centered away from the user) viewpoints and may display adjustable fields of view. Further aspects of the invention include rendering objects in locations referenced to a real geoid such that objects are positioned correctly in relation to the curvature of the earth. Further aspects of the invention include displaying arrows that show a user in which direction to move to find objects that are not displayed on screen; letting a user add virtual objects to a scene or electronically mark existing objects; and the ability to record and play back whatever is shown on screen.

Further aspects of the invention include the capability of a synthetic vision device to communicate with remote databases or other digital devices via wireless data links. Further aspects of the invention include the capability of selecting different layers of data to be displayed or to declutter a scene by omitting data layers. Further aspects of the invention include a user interface based on speech recognition or on physical gestures such as tapping, jogging or shaking. Finally, according to further aspects of the invention a synthetic vision device may be fully incorporated into a cell phone or personal digital assistant or similar device.

FIG. 1 shows a synthetic vision device used to visualize the spatial relationship between a piece of machinery and an underground object at a construction site. In the figure an excavating machine 105 is digging a hole near a utility pipe 110. The problem facing the machine operator is to dig around the pipe without touching it or breaking it. It is difficult for the operator to get a clear view of the pipe. Panel A in the figure shows a handheld synthetic vision device 115 which may be mounted in the cab of the excavator for convenience. The display 117 in Panel A shows a view of the excavator bucket 120 near the pipe 110.

The synthetic vision device "knows" the position of the excavator bucket because it senses its own position and the extension of control hydraulics such as actuators 125, 126 and 127. The device "knows" the position of the pipe because it is stored in its database of objects. Therefore the device can display the bucket and pipe in proper relative position and from any perspective. The view shown to the operator by the display in Panel A is useful in that it shows that further vertical movements of the bucket will not hit the pipe. However it is not clear from the view displayed in Panel A whether or not swinging the bucket from side to side would make it hit the pipe. One cannot tell if the bucket is above the level of the pipe or not.

To overcome this problem the operator may select a view from a different perspective such as the view shown in Panel B. The operator may select different views of a situation by pressing a button such as button 130 or a combination of buttons. In alternate embodiments of the invention an operator could select different views or other functions by using any number of user input devices such as mice, joysticks, keyboards, voice commands, or gesture-based user input. Once the operator has selected the view shown in Panel B it becomes clear to him that the bottom of the bucket is below the level of the pipe and therefore that he should use caution in moving the bucket side to side. In this example a person uses a synthetic vision device according to an aspect of the invention to visualize the position of two real objects, namely the bucket of an excavating machine and a buried pipe. However, the synthetic vision device may also be used to display objects that do not exist, for example planned structures that are yet to be built.

Figure 2:
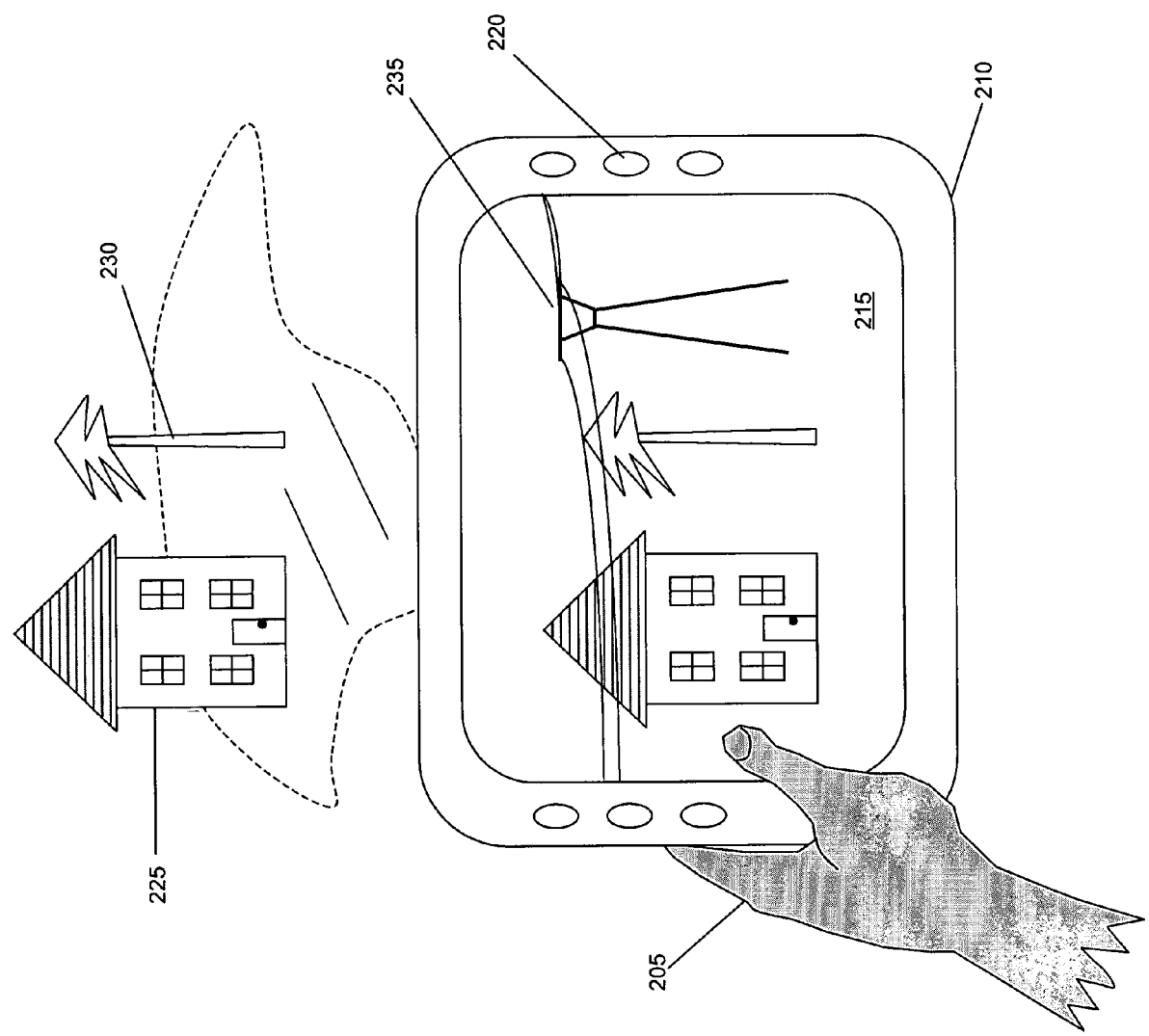
FIG. 2 shows a synthetic vision device used to visualize a direct real world view from a user's actual position augmented by computer generated objects from a database.

FIG. 2 shows a synthetic vision device used to visualize a real world view from a user's actual position augmented by computer generated objects from a database. In the figure a user (only his hand 205 is shown) holds a synthetic vision device 210. The device contains a display 215, a sensor suite (not shown) and a computer (not shown) all contained in the handheld unit. The device also incorporates several buttons such as button 220 and other user input devices such as mice, joysticks or keyboards may be included. In the figure the user is aiming the device toward a house with a tree growing beside it. The display 215 shows an actual video image of the house and the tree. The display also shows an image of a power line 235 that does not exist in the real scene. The synthetic vision device allows the user to visualize what the power line will look like if it is built near the house. This is a handy feature for architects or civil engineers planning new construction. Since the power line is merely an object in an electronic database the operator of the synthetic vision device may manipulate it electronically as easily as if he were using a computer drawing program. For example, he may want to see what the power line would look like if it were routed behind the house instead of in front of it. He may want to record tags or notes on various objects in the scene. When the desired power line location is determined the operator can then use the synthetic vision device to update a database and store the location and notes for the use of construction personnel who will actually construct the power line.

The view shown in FIG. 2 is an egocentric view. In other words it is the view that the user sees simply by looking at the scene in front of him. If the user wants to see the scene from another perspective he can walk to a new position and point the synthetic vision device in the direction he is interested in. This mode of operation is possible because the device incorporates precise positioning technology in its sensor suite. For example, depending on the application involved, global positioning system (GPS), GPS with the wide area augmentation system (WAAS), GPS with a local area augmentation system (LAAS), real-time kinematic GPS, laser range finding or any number of other positioning technologies may be incorporated into the synthetic vision device. In a typical outdoor construction scenario as depicted in FIG. 2 GPS with WAAS is a likely choice of positioning systems since very compact GPS/WAAS receivers providing rms position accuracy of 3 meters with 95% confidence are readily available and cost less than $100.

In most applications the synthetic vision device also includes an attitude sensor in its sensor suite. Many attitude sensors sense rotation rate about three orthogonal axes in space. Such sensors are readily available and are commonly based on micro-electromechanical systems (MEMS) tuning-fork rate gyroscopes. Attitude sensor systems are also commonly packaged with magnetometers for determination of magnetic heading and with MEMS accelerometers for determination of linear acceleration. A sensor package containing a MEMS rotation rate gyro, a MEMS accelerometer and a magnetometer for each of three orthogonal spatial axes easily fits in a cube approximately 2 cm on a side.

The synthetic vision device uses position and attitude sensors in its sensor suite to determine where it is and in which direction it is pointing. Using that data it can cull digital objects from a database and render them on the display. The display can also show live video of the actual scene simultaneously. Thus a complete picture such as that shown on display 215 is generated.

Figure 3:
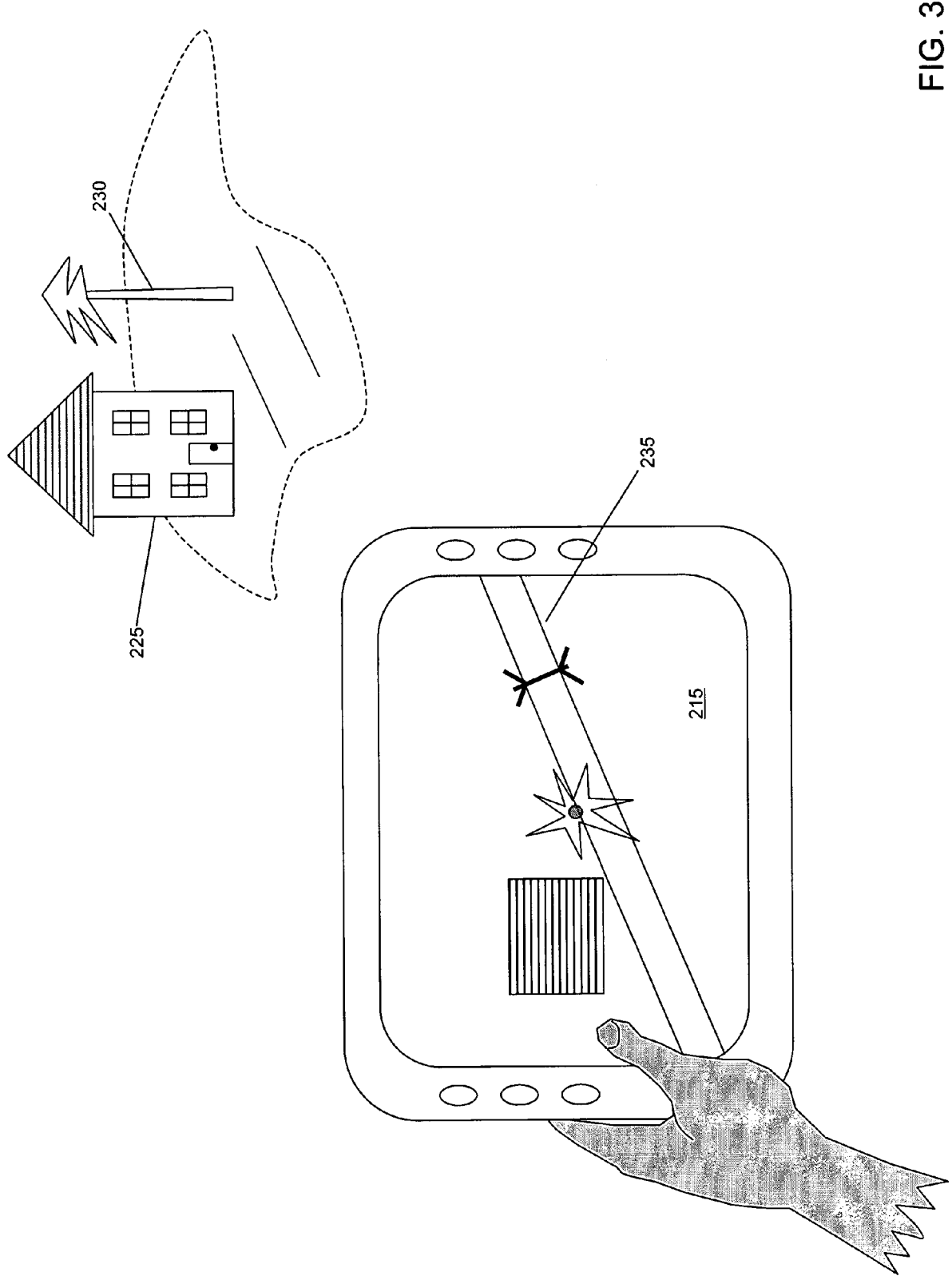
FIG. 3 shows a synthetic vision device used to visualize the view of FIG. 2 from a different perspective not corresponding to the viewer's actual position.

The user or operator of the synthetic vision device may want to view a scene from other than his own current viewpoint however. FIG. 3 shows a synthetic vision device used to visualize the view of FIG. 2 from a different perspective not corresponding to the user's actual position. In FIG. 3 a top view of the actual scene is displayed on the display 215 of the synthetic vision device. This view shows that the power line passes over part of the tree and near the corner of the roof of the house 225.

Display of database objects such as power line 235 from different perspective viewpoints is accomplished with computer graphics rendering techniques. However, display of the house and the tree may also depend upon video manipulation depending on whether or not their locations, sizes and shapes are stored in a database. If data describing the house and the tree are present in the database then those objects may be displayed from any viewpoint. If only video data is available then it is possible to use that data to form a new database object and display it in the proper position; however, some information on parts of the scene that were not recorded on video may not be possible to display. The synthetic vision device may incorporate laser or acoustic rangefinders to aid in determining the location of objects that are in a live video image.

In visualization applications such as those illustrated in FIGS. 1, 2 and 3 it is likely that some registration errors will be present. Registration error means that digitally created objects are not displayed in the correct position with respect to video images. Registration errors arise from position sensor inaccuracy, attitude sensor inaccuracy, and boresighting inaccuracy and misalignment.

According to an aspect of the invention there are several ways to reduce the importance of registration errors when forced to use inaccurate sensors. First of all it is often easier to register digitally created graphic objects with video images of a real scene than it is to register with a direct optical image such as might be seen through a telescope. The video image as displayed on, for example, an active matrix liquid crystal display (AMLCD) contains a limited number of pixels. There is no need to register images to a resolution better than one pixel in this situation.

Another technique used to reduce the importance of registration error is to expand the field of view shown on the display. When an expanded field of view is shown, each pixel in the display corresponds to a larger real distance. Registration need only be as accurate as the distance represented by one pixel although the state-of-the art is not yet near this accuracy.

Furthermore, the source of registration error depends on the distance to the objects being viewed. For close objects, position error contributes most to registration problems; for distant objects, attitude error is more important. Currently, precise positioning technology is less expensive and more compact than precise attitude determination devices. Therefore in some situations registration error can be made less problematic by precise positioning.

Figure 4:
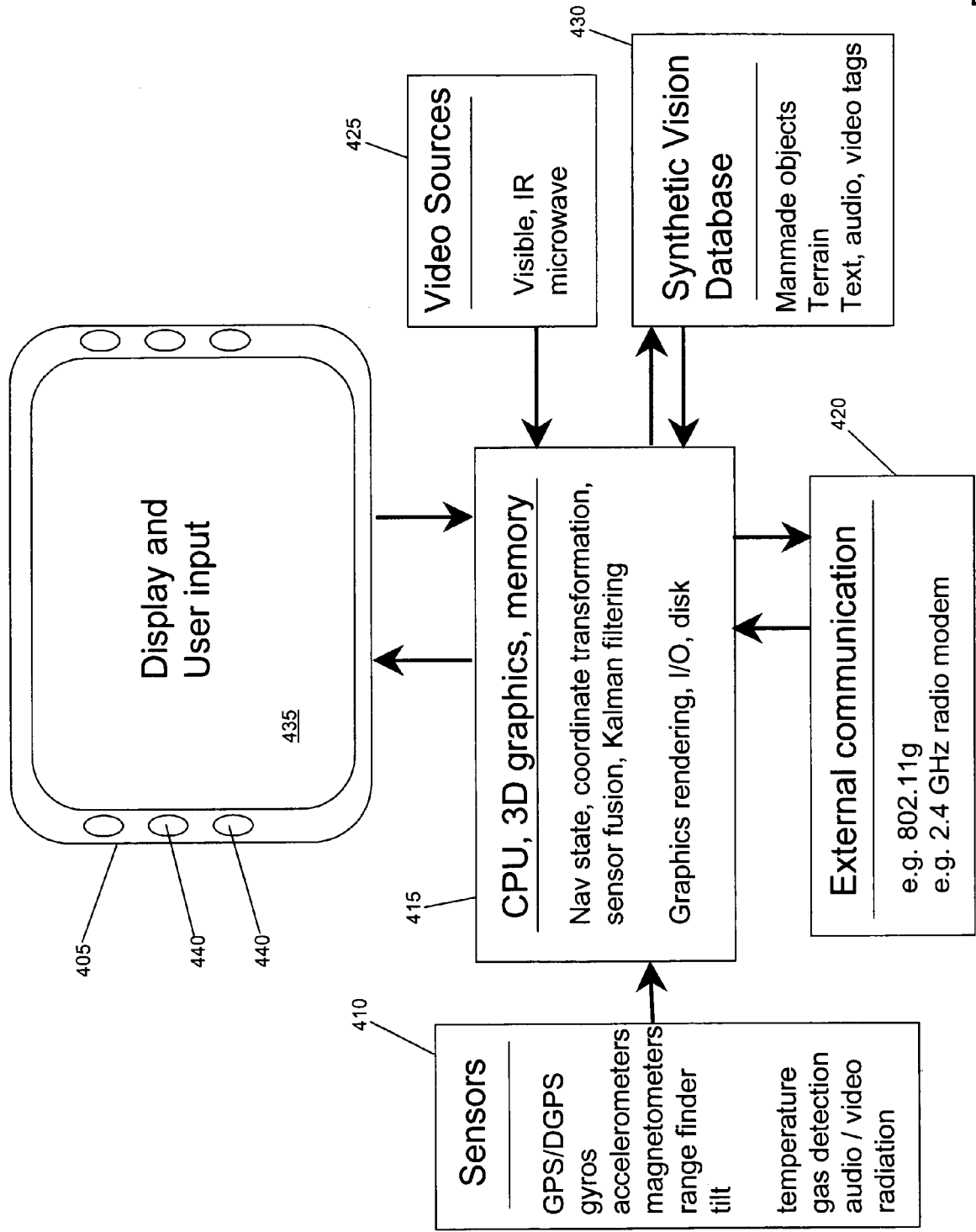
FIG. 4 shows a schematic block diagram of the major subsystems of a synthetic vision device.

FIG. 4 shows a schematic block diagram of the major subsystems of a synthetic vision device. As shown in the figure a synthetic vision device may include a display and user input unit 405, a sensor suite 410, a computer including a central processing unit, three dimensional graphics capability and memory 415, external communications devices 420, video sources 425 and a synthetic vision database 430. In a handheld synthetic vision device according to an aspect of the invention most, if not all, of these subsystems are enclosed in a single, handheld unit.

The display and user input unit 405 contains a display 435 and user input devices such as buttons 440. Other user input devices besides buttons may be used. For example, keyboards, joysticks, touchpads, mice, rotary knobs, speech recognition devices may all be used for user input. Additionally user input or commands to the device may be accomplished through a gesture based user interface. In such an interface gestures such as shaking, jogging, pointing, tilting or squeezing the handheld synthetic vision device are interpreted as commands to the computer 415.

The display 435 may be any display of convenient size and resolution for the intended application of the overall device. For example, the small, low resolution display of a cell phone may be sufficient for basic embodiments wherein the synthetic vision device is used to give simple directions to the user. Helping the user find his or her car by displaying an arrow in the direction of the car is an example of an application where a cell phone display is sufficient. The display may also be medium sized such as a display commonly used for standard laptop computers. Such a display has a diagonal measurement between about four and fourteen inches and between about 500,000 and 2,000,000 pixels. A medium resolution display is useful in a wide variety of synthetic vision applications. Finally, larger and/or very high resolution displays having between about 2,000,000 and 10,000,000 pixels are useful in situations where high quality, photorealistic imagery is important. Liquid crystal displays of low, medium, and high performance are often preferred for a synthetic vision device. However, other display technologies such as plasma screens or electronic ink are also suitable. In an actual prototype handheld synthetic vision system a Sony VAIO U750 seven inch diagonal display with internal Pentium-based computer was used. In that system user input was accomplished with a stylus and touch sensitive screen.

The sensor suite 410 may contain position, attitude, heading, distance, temperature, audio, video, radiation, gas, tilt, magnetic field and any number of other sensors. However, at least one position sensor is required. For outdoor applications GPS and its variants are preferred position sensors. GPS with WAAS delivers three meter or better position accuracy anywhere in the continental United States at very low cost. GPS with LAAS or real-time kinematic GPS offer accuracy of ten centimeters or better. For indoor applications position sensing may be accomplished with laser triangulation systems such as those in use at indoor construction sites or indoor GPS pseudolites for example.

In all but the simplest applications a three dimensional attitude sensing system is required. Attitude systems based on MEMS gyro rotation rate sensors are desirable due to their small size and weight. Ring laser or fiber optic gyroscopes also work, but are more expensive, larger and heavier. In an actual prototype handheld synthetic vision system an InterSense InertiaCube2 was used as the attitude sensor. The InertiaCube2 provides 360 degree attitude information about yaw, pitch and roll axes tracking up to 1200 degrees per second with 0.01 degree resolution. It includes a rotation rate gyro, an accelerometer and a magnetometer for each of the three axes. Attitude updates are output at 180 Hz and the entire unit weighs 25 grams. For very simple applications it may be possible to use only a single heading sensor such as a magnetometer as a one-dimensional attitude sensor.

Linear accelerometers are included in the sensor suite 410 to provide inertial navigation information. MEMS accelerometers are the lightest, most compact acceleration sensors and are preferred. In an actual prototype handheld synthetic vision system linear accelerometers were included in an InertiaCube2 sensor system.

Magnetometers are included in the sensor suite 410 to provide direction information with respect to magnetic north. If position is known, then magnetic direction may be easily converted to true direction measured with respect to true north. In an actual prototype handheld synthetic vision system magnetometers were included in an InertiaCube2 sensor system.

A range finder, such as a laser or acoustic range finder, is a useful sensor for many applications and may be included in sensor suite 410. In some situations a user may see an object depicted on the display of his handheld synthetic vision device and need to know whether that object is in front of or behind another object. For example, a vehicle may be displayed while video information (and perhaps visual confirmation) shows a solid wall some distance in front of the user. In this case, as an example, a range finder is used to measure the distance to the nearest object in the line of sight, e.g. the wall. If the distance to another object in the line of sight is calculated to be greater than the distance to the wall then that object can be displayed differently to the user to indicate that it is behind the wall. The range finder provides the necessary distance information for the computer to compare calculated distances to database objects with range-finder-measured distances to any object in the line of sight.

Tilt, temperature, radiation, electric field and other sensors may be included in the sensor suite 410. It is most convenient if these sensors are contained within the handheld unit that houses the synthetic vision system. However, there may be cases where it is advantageous for the handheld unit to receive sensor data via a data link such as those that are contained in the external communication devices suite 420.

The external communications devices suite 420 contains components that allow the handheld synthetic vision system to communicate with external systems such as other synthetic vision systems, external databases, or other mobile units. Communications devices include wireless systems adhering to the 802.11g and related standards, radio modems at 2.4 GHz and other frequencies, infrared ports, satellite radio communication systems, cellular telephone and paging network devices and other electronic communication means.

Video imagery sources 425 are devices such as visible and infrared video cameras that provide real-time actual images. The images may represent views seen in any portion of the electromagnetic spectrum including x-ray, visible, infrared, microwave, millimeter-wave or terahertz radiation. The most common video imagery sources are visible and infrared video cameras. In an actual prototype handheld synthetic vision system a miniature Logitec Quickcam 4000 video camera was used to acquire real-time actual video images.

Digitally created computer graphic objects are stored in a synthetic vision database such as database 430. The computer graphic objects are stored in memory devices such as RAM, ROM, CD-ROM, DVD-ROM, flash memory, magnetic disk drives, and the like. The objects may be represented in various ways but commonly are represented in terms of point locations of the corners of polygons that are drawn to make a graphic object. Alternatively a graphic object may have a predetermined shape so that only the identification of that shape and, location of its center and its attitude or spatial orientation need be stored in memory. When the data from the data base is loaded into the working memory of computer 415 object locations are transformed and registered with a common spatial reference frame which is typically the WGS-84 coordinate reference frame including a realistic geoid model when necessary.

Pre-recorded video images may also be stored in the database. The database may contain information on manmade objects such as cars or buildings, terrain objects such as mountains and lakes, or descriptive text, audio or video tags associated with any kind of object.

A computer 415 including a central processing unit, three dimensional graphics capability and memory forms the core of the handheld synthetic vision system. The sensor suite 410, display and user input unit 405, video sources 425, database 430, and external communication devices are all connected to the computer. In a prototype handheld synthetic vision system a Sony VAIO U750 handheld computer incorporating an Intel microprocessor and running the Microsoft Windows XP operating system served as the computer system. This computer includes three dimensional graphics capabilities and onboard random access memory. The computer runs a software program that processes incoming information from the sensors, external communications interfaces, databases, video sources and user inputs and displays a rapidly updated synthetic view on the display 435. The computer also outputs information to other devices through external communications devices 420.

The Sony VAIO U750 computer used in a prototype handheld synthetic vision system incorporates a 1.1 GHz Intel Pentium-M processor, Microsoft Windows XP Professional operating system, a 5 inch 800×600 LCD display, Intel 855GM video chipset with 64 MB of shared memory, 512 MB RAM, and a 20 GB hard disk with 2 MB cache. Integrated 802.11g WiFi wireless networking and Ethernet communications are included. User input is accomplished through a touchscreen, 5-way directional pad, mouse pointer and a USB keyboard. The unit is 6.6 inches long by 4.25 inches wide by 1 inch thick and weighs 1.2 pounds.

Figure 5:
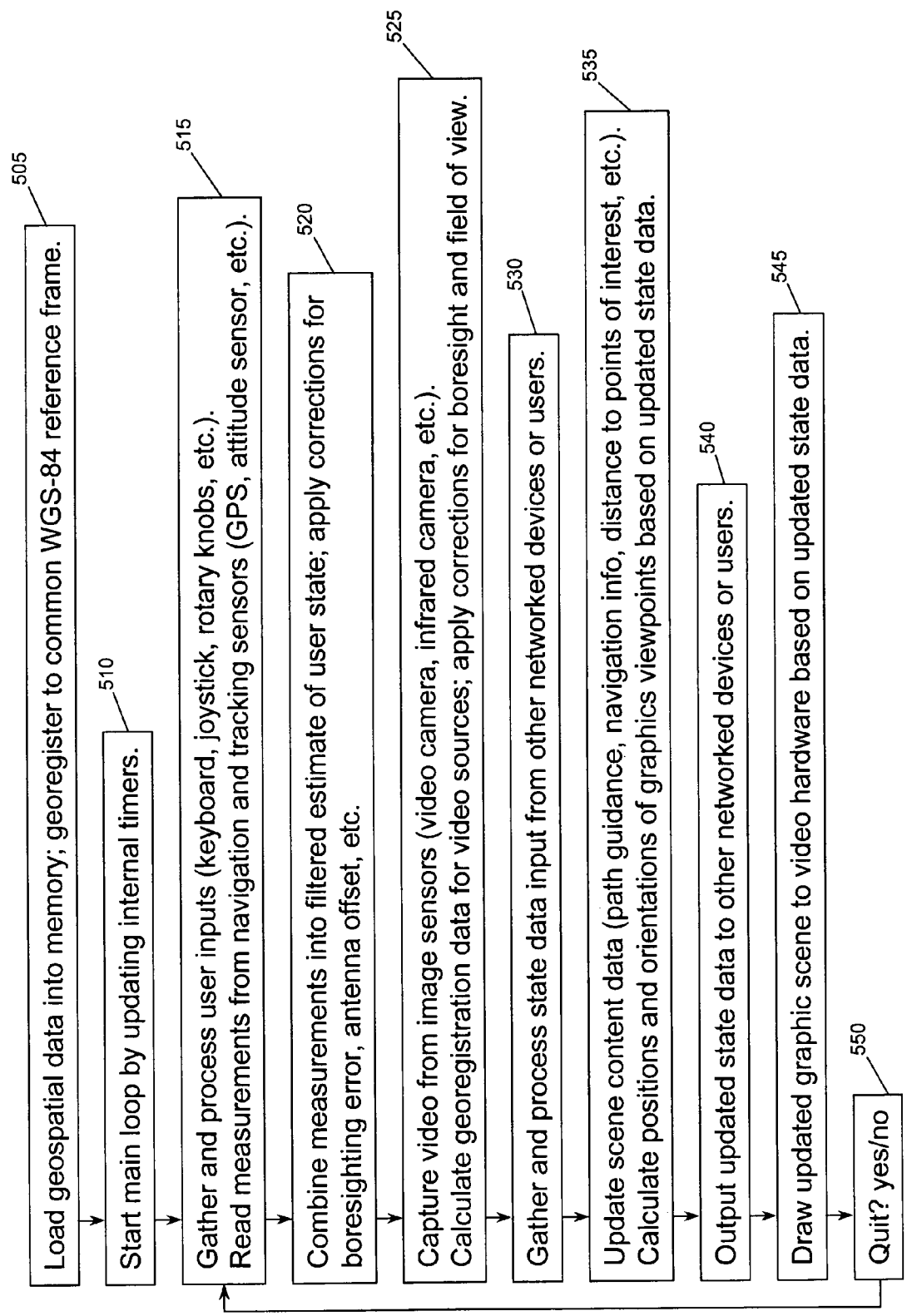
FIG. 5 shows a flow chart of the major steps in a software routine for a synthetic vision device.

FIG. 5 shows a flow chart of the major steps in a software routine for a synthetic vision device. In the figure item 505 is the first step in the routine. In this step geospatial data such as objects in the database, map data, pre-recorded satellite imagery, public utilities information and the like area loaded into the computer's onboard memory. Different kinds of geospatial data supplied by different sources may include position information that is provided in reference to different reference frames. In step 505 all of the data is converted to the WGS-84 reference frame to provide common georegistration. It would be possible to use another reference frame instead of WGS-84, but WGS-84 is widely used and is convenient.

Step 510 is the beginning of a main loop. In this step internal timers are started. These timers are used to provide timing and synchronization for various parts of the synthetic vision system.

Step 515 consists of two parts: gathering and processing user inputs, and reading measurements from navigation and tracking sensors. In this step user inputs such as keyboard input, joystick movements, button presses, knob positions and the like are obtained from their respective user input devices and loaded into memory. Similarly measurements from sensors such as GPS position sensors, attitude sensors, range finders and other sensors are loaded into memory.

In Step 520 measurements gathered in Step 515 are combined into a filtered estimate of the user state. The user state contains data from all attached sensors and navigation information derived from the raw data. Navigation data is stored in several coordinate systems such as WGS-84, east-north-up (ENU), and latitude-longitude-altitude (LLA). It is preferred to keep navigation data in several coordinate systems because certain coordinate systems are more convenient from a computational standpoint for certain calculations. As a general example, in cases where the curvature of the earth's surface is not important an ENU reference frame might be computationally preferred over LLA; if the curvature of the earth's surface is important—for long distance calculations for example—then LLA may be a better choice. Storing navigation information in multiple coordinate systems in the user state saves time in later computations. Similarly the user state contains transformation matrices necessary to transform vectors from one coordinate system to another. Having these matrices available in the user state speeds up later computations.

The user state is filtered if necessary. Different filters may be applied to different variables. Filtering is used to combine information from data sources that update at different rates, to smooth transitions when a data source updates slowly and to decide which incoming data is most important for updating the user state. Kalman filtering, sensor fusion or display smoothing algorithms enhance the quality of the displayed scene when slow or asynchronous data is received from the sensor suite or the video camera. Examples of filtering strategies that are commonly used in the program are: zero order (position) hold, first order (velocity) hold, and Kalman filtering. In an actual prototype handheld synthetic vision system all of these filtering modes were used when needed.

Also in Step 520 corrections and offsets are applied to incoming data to account for boresighting error, antenna offset and similar origin dislocations. The boresight is the vector describing the direction that the synthetic vision device (or, for example, its video camera) is pointing. Antenna offset refers to the vector to the location of a GPS antenna from the origin of the boresight.

Video data from video image sensors is captured in Step 525. Since the video data could be video arriving over a data link in addition to video from onboard video cameras it must be georegistered in the same way that database information was georegistered in Step 505. Furthermore, boresight and field of view corrections are applied to the incoming video data. Field of view refers to the solid angular extent of a video camera's effective view frustum.

According to an aspect of the invention a handheld synthetic vision device may be operated as a stand alone unit or it may operate in a network of similar units or it may communicate with other types of devices over a network. For example it may communicate with remote sensors, databases or display units. In Step 530 this state data from other networked devices and users is gathered and processed. The user state data may arrive via one of the wireless data link devices.

Once user inputs and sensor data have been gathered and processed, the user state has been filtered and estimated, video has been captured and external user states have been loaded from networked devices, the system is ready to update its scene content data. This occurs in Step 535 where path guidance, navigation information, distances to points of interest and similar data are calculated. Positions and orientations of possible graphics viewpoints are calculated based on the updated state data. In other words all the calculations needed to figure out what to draw on the display and where to draw it are performed.

As an example, the positions of tunnel navigation symbols are calculated in Step 535. Graphics viewpoints refer to points of view that may form the basis for what is displayed on screen. If the user has selected an egocentric display, then origin of the graphics viewpoint is the position of the handheld synthetic vision device. The egocentric viewpoint may be displayed with a natural field of view showing the same field of view as a literal glass window of the same dimensions as the display. Alternatively it is often useful to display an expanded field of view wider (and/or taller) than the natural or literal view. This is helpful because it makes registration errors less apparent.

Alternatively the user may have selected an exocentric viewpoint corresponding to a view from overhead the user, off to one side, looking in another direction, etc. Whatever the viewpoint, the content of the scene to be displayed is calculated in Step 535.

The content of a scene for a given view point depends on what actual or digitally created objects fall within the view frustum corresponding to the selected viewpoint. The view frustum is the volume bounded by the angular extent of the field of view and by minimum and maximum distances. As an example, the volume bounded by an angular extent from a boresight in two orthogonal directions and bounded by two distances along the boresight is a possible view frustum for the origin of the boresight.

Once the scene content data has been updated and the positions and orientations of graphics viewpoints have been calculated, updated state data is output to other networked devices and users in Step 540. For example, some networked users might like to see the same image that is displayed on the synthetic vision device. The image data is sent to them in this step. Other users might like to see the same data, but from a different viewpoint. In that case they can take the data output in Step 540 and transform it to their desired viewpoint.

In Step 545 the graphic scene is drawn on the display or other video hardware based on updated state data. In an actual prototype device this is accomplished by calling routines from the OpenGL application programming interface. However, other graphics libraries such as Direct3D would also work. The graphics routines serve as an interface to either a fast microprocessor such as an Intel Pentium class processor or a dedicated graphics chip such as are widely available from companies such as nVidia or ATI. Very compact computers such as the Sony VAIO U750 used in a prototype device are able to update the graphics display as fast as 20 Hz. There is a clear path to even better performance in the near future using recently announced multicore microprocessors and graphics chipsets.

If the user has decided to end the program, it quits in Step 550. Otherwise, user and sensor inputs are gathered in Step 515 and the loop begins again.

Figure 6:
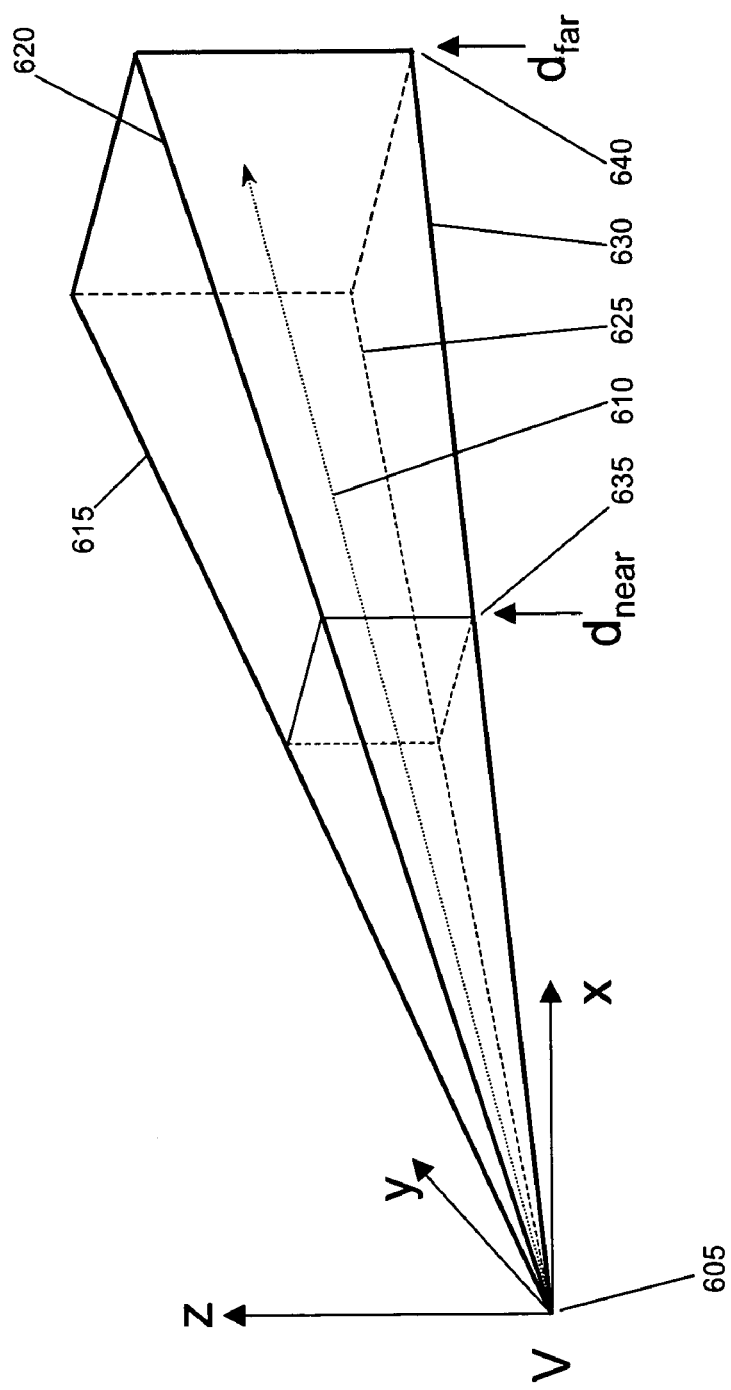
FIG. 6 shows a view frustum used in rendering computer graphics.

FIG. 6 shows a view frustum used in rendering computer graphics. The frustum is a mathematical construct that is used in deciding which objects from a graphics database should be drawn on a display. Briefly, a database is culled for objects that lie within or partly within a frustum. Objects that lie at least partly within the frustum are rendered on the display in proper perspective according to the direction from which they are viewed. The database need only store the location, shape and orientation of each object once since it is drawn in proper perspective according to graphics routines using the current view frustum.

In FIG. 6, point "V" 605 is the viewpoint or origin of the view frustum. Vector 610 is the boresight or direction that the frustum is pointing as referenced to the x, y, z coordinate frame. The angular extent of the frustum is bounded by lines 615, 620, 625 and 630. The extent of the frustum is bounded by distances away from the origin "$d_{near}$" 635 and "$d_{far}$" 640. The volume that lies within these bounds is the frustum. The graphics routine or scene graph builds a draw list by culling objects from the database that lie in or near the frustum. The tremendous advances in computer graphics made in response to the demand for video games have included wide ranging use of graphics techniques that were unheard of or impossible to realistically implement just a few years ago.

The "registration problem" mentioned above is common to all synthetic vision systems that simultaneously display actual real-time images and digitally created graphics superimposed upon one another. Registration is the task of getting the two image sources to line up properly with each other. Most registration problems can be traced to errors in the handheld synthetic vision device's estimate of its position or attitude. Position errors become most important when displayed objects are close to the user or to one another. Attitude errors are most important for distant objects. Increasing distance reduces the effect of position error. As distance increases, attitude error comprises a greater and greater fraction of the total error while total error decreases to the point where attitude error is the only contributor to it.

Figure 7:
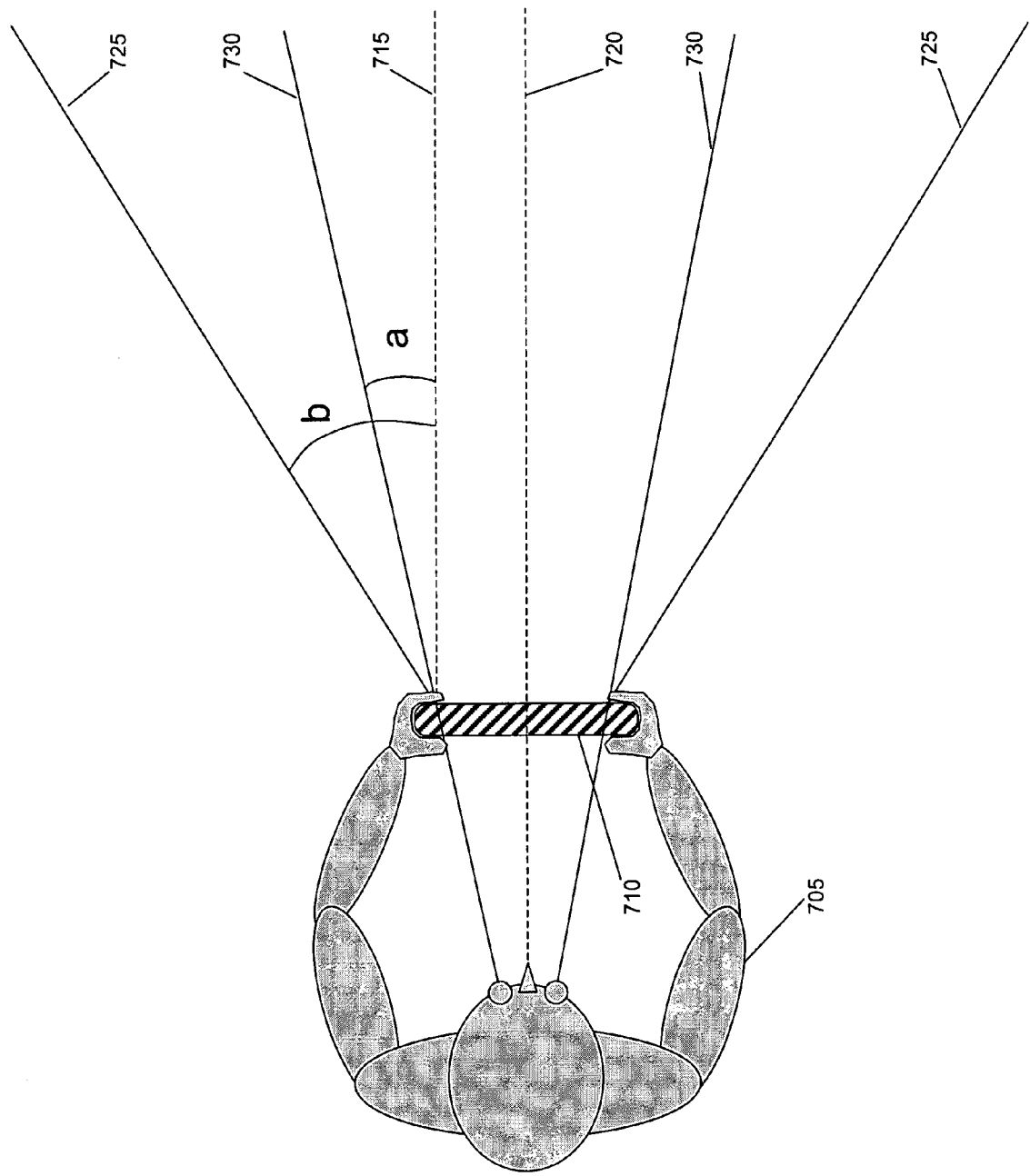
FIG. 7 shows a top view of a user holding a synthetic vision device and illustrates two different possible fields of view that may be displayed by the device.

Luckily, according to an aspect of the invention, while registration errors themselves are fundamentally limited by the accuracy of position and attitude sensing hardware, there are display techniques that reduce a user's perception of registration errors. Further, there are some cases in which users are naturally comfortable accepting registration errors even when they are plainly apparent. FIG. 7 illustrates (in a top down view) a user holding a handheld synthetic vision device and the lateral extent of two different fields of view that might be displayed on it.

In the figure a user 705 is holding and looking at the display of a handheld synthetic vision device 710. If synthetic vision device 710 were replaced by a transparent piece of glass the user's angular field of view through the glass would be bounded by lines 730 which form an angle "a" with boresight 720 or equivalently with line 715 which is parallel to boresight 720. On the other hand it is advantageous in many situations to display a scene with a wider field of view such as that bounded by lines 725 which form an angle "b" with boresight 720 and line 715. This expanded field of view, while not literally reproducing what one would see through a glass window, seems natural to most users. According to an aspect of the invention the expanded field of view has several advantages in a handheld synthetic vision device. First of all, more information is displayed. Second, each pixel in the display corresponds to a greater distance in the scene being viewed. The problem of registration is easier with an expanded field of view. The requirements for position and attitude accuracy are not as stringent as they are for a narrower view.

Figure 8:
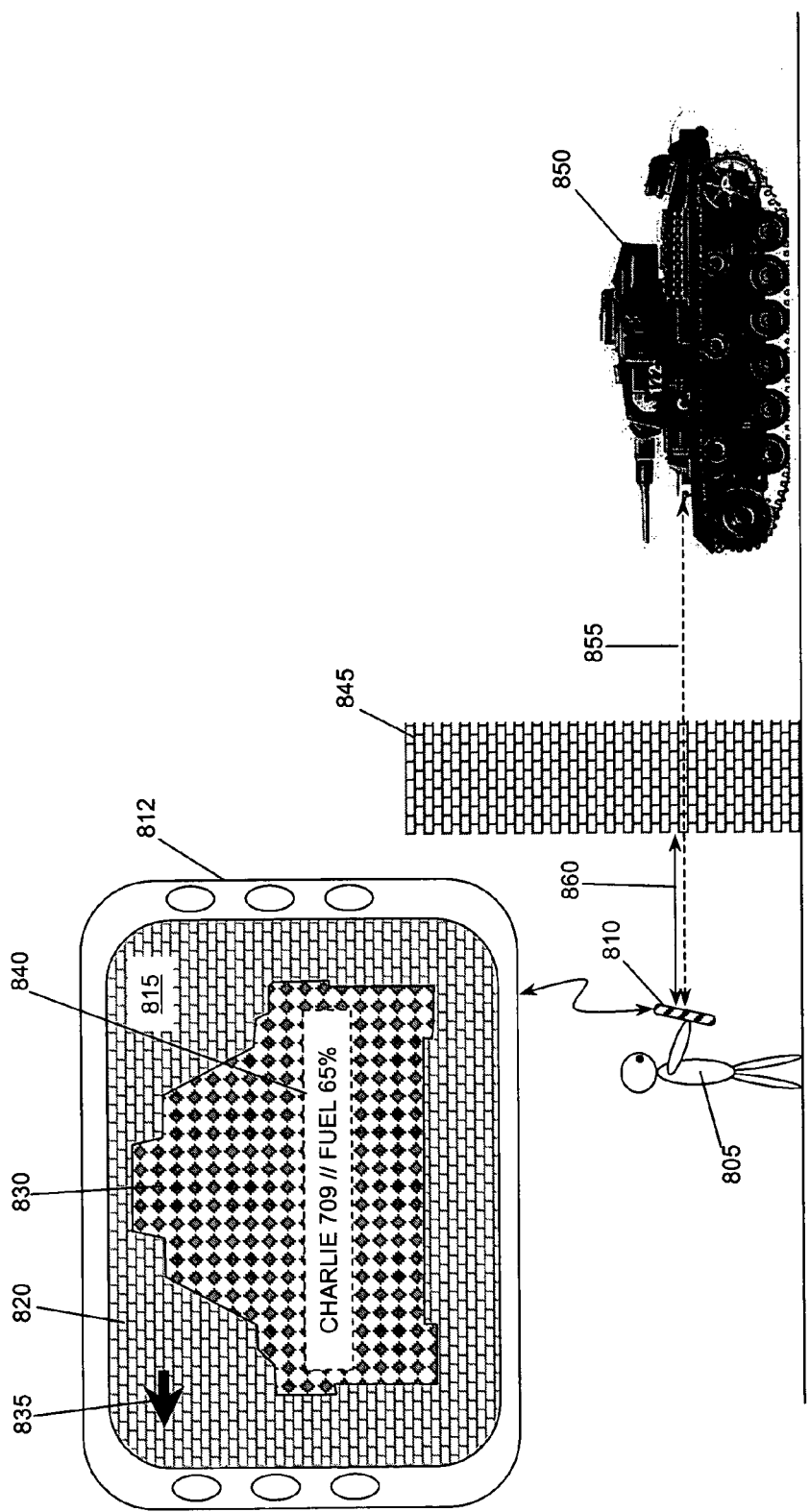
FIG. 8 shows a person using a synthetic vision device to look at an object behind an opaque wall. A close up view of the display of the device is also shown.

FIG. 8 shows a person using a synthetic vision device to look at an object behind an opaque wall. A close up view of the display of the device is also shown. In the figure, person 805 is holding a synthetic vision device 810. An enlarged view 812 of the device as seen by the user is also illustrated. The person is using his synthetic vision device to see a tank 850 located behind wall 845. The tank 850 is depicted on the display 815 of the synthetic vision device 810, 812 as an outline shape filled in with a diamond pattern 830. A video image 820 of wall 845 also appears on the display.

Synthetic vision device 810, 812 is equipped with a range finder. The range finder measures the distance 860 to the first optically or acoustically opaque object along the boresight, in this case wall 845. The location of tank 850 is known to device 810, 812 because the tank has sent its position information to the synthetic vision device via a wireless data link. Therefore the device can calculate the distance 855 between itself and the tank by comparing its position and the tank's position. According to an aspect of the invention the style in which tank 850 is rendered on display 815 indicates whether or not it is the closest object to device 810, 812. In the figure, the tank is not the closest object; it is farther away than wall 845. Therefore the tank is shown with a distinctive fill pattern 830. Other styles could also be used to distinguish near and far objects; for example color or shading. However, it is the combination of the range finder, position information for a database object (e.g. the tank), and the ability of the synthetic vision device to calculate and compare distances that lets the synthetic vision device deduce which objects are closer to it than others. The near-to-far ordering is indicated on the display by displaying objects in different styles or even shapes.

An arrow 835 also appears on display 815. According to an aspect of the invention arrows on the display are useful to point to off-screen objects. For example, a user of a handheld synthetic vision device might decide to mark a spot in a view displayed on his display for future reference. If the synthetic vision device were an advanced cell phone, a user could point the device toward his car in a large parking lot and push a button or other user input device to tell the synthetic vision device to remember where his car is parked. Later, upon returning to the parking lot, the user would look at the display of the synthetic vision device to find out which way to walk to return to his car. If the device happened not to be pointing in the direction of the car, then the electronic mark left near the car would not be visible on the screen. But an on-screen arrow, such as arrow 835, would indicate to the user which way to rotate the device such that the car (or a 2D or 3D graphical symbol registered with the car) will become visible on the screen. This arrow is not shown once the target (in this case a car) is registered on the display. In this way, arrows can be used to point to any number of items that occur in the synthetic vision database, but are not displayed on the screen at a given time.

Figure 9:
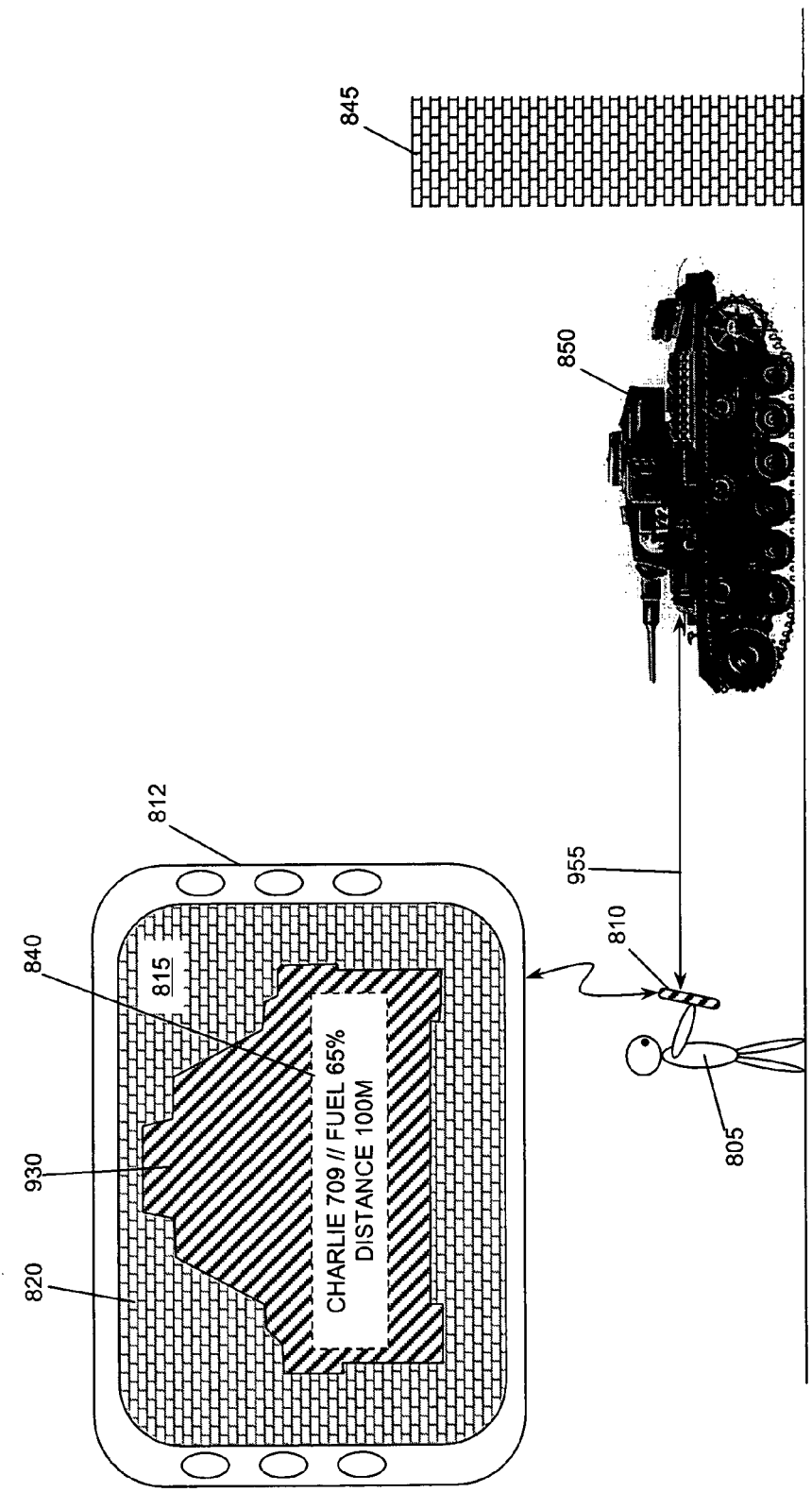
FIG. 9 shows a person using a synthetic vision device to look at an object that is in front of a wall. A close up view of the display of the device is also shown.

FIG. 9 shows a person using a synthetic vision device to look at an object that is in front of a wall. A close up view of the display of the device is also shown. FIG. 9 is similar to FIG. 8 except that tank 850 is closer to the user 805 than is wall 845. Distance 955 may be measured directly by a range finder and by subtraction of database distances. In this case the two methods of finding distance will give the same result since the tank is the closest object to the user. The fact that the tank is the closest object is also highlighted to the user by the new fill pattern 930 used to render it on display 815. In both FIG. 8 and FIG. 9 an information box 840 appears on the display. The information box may show text or graphic symbol information about an object that is being displayed. For example, in FIG. 8 the information box tells the user that the tank's call sign is "CHARLIE 709" and its fuel state is 65%. In FIG. 9 the information box contains the additional information that the tank is 100 meters from the user. The user may select what information he would like to see about any object on the screen or any object off screen but pointed to by an arrow, e.g. arrow 835, by pressing buttons on the handheld synthetic vision device or by using other standard user input methods.

Figure 10:
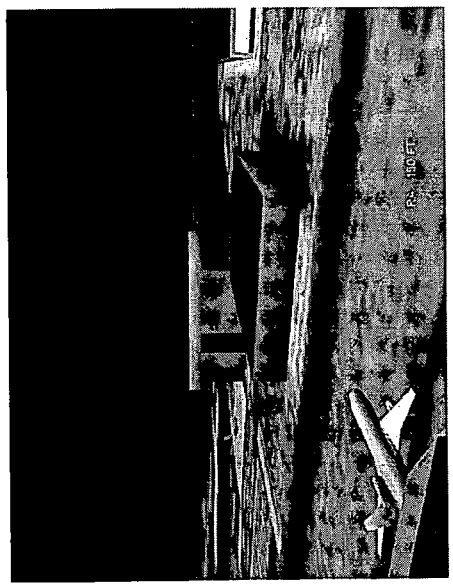
FIG. 10 shows views of a scene from different perspectives as displayed on a synthetic vision device.
Figure 10:
Figure 10:
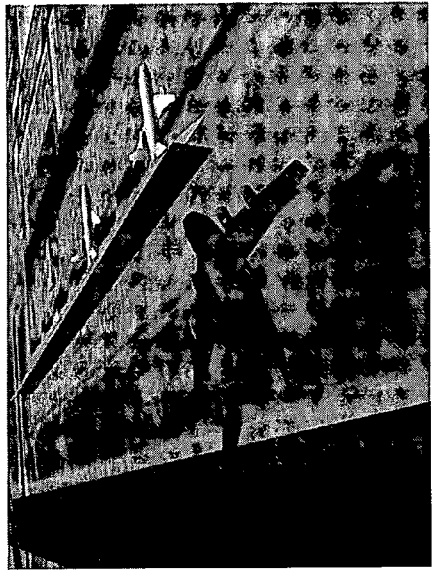
Figure 10:
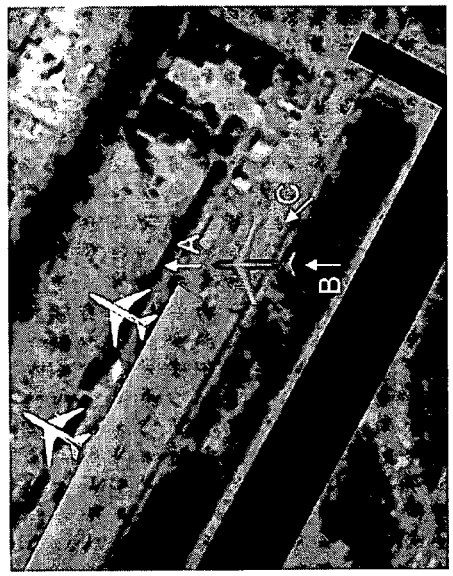

It is often useful for a user of a handheld synthetic vision device to be able to change the perspective of the displayed view from an egocentric perspective to an exocentric one. This capability allows the user to "fly around" and see his environment from a bird's eye view or perhaps from an underground perspective. FIG. 10 shows views of a scene from different perspectives as displayed on a synthetic vision device. Views from four different perspectives, labeled "A", "B", "C" and "D", are shown. In this application the user is in the cockpit of an airplane that is flying near an airport.

View "A" is an egocentric view. It is the view that the user himself sees out the window of the airplane. Of course if the airplane is flying in a cloud the view out the window would be white and featureless. In that case the egocentric view shown by the synthetic vision device would be very valuable as replacement for normal vision. View "B" is an exocentric view from a point behind and above the airplane. In this view the user sees his airplane as well as others that are parked on the airport below. View "C" is an exocentric view from a position behind, above and on the right hand side of the user's airplane. This view is useful if the user wants to look out for traffic coming from the left hand side of his airplane, for example. Finally, View "D" is an exocentric view from very far overhead. This view is also called a "map view" since it is the same perspective as a traditional map. This view is useful for navigation augmented by information about the location of mobile objects as reported from the database. Arrows labeled "A", "B" and "C" in View D show the direction of view for views A, B and C respectively.

Figure 11:
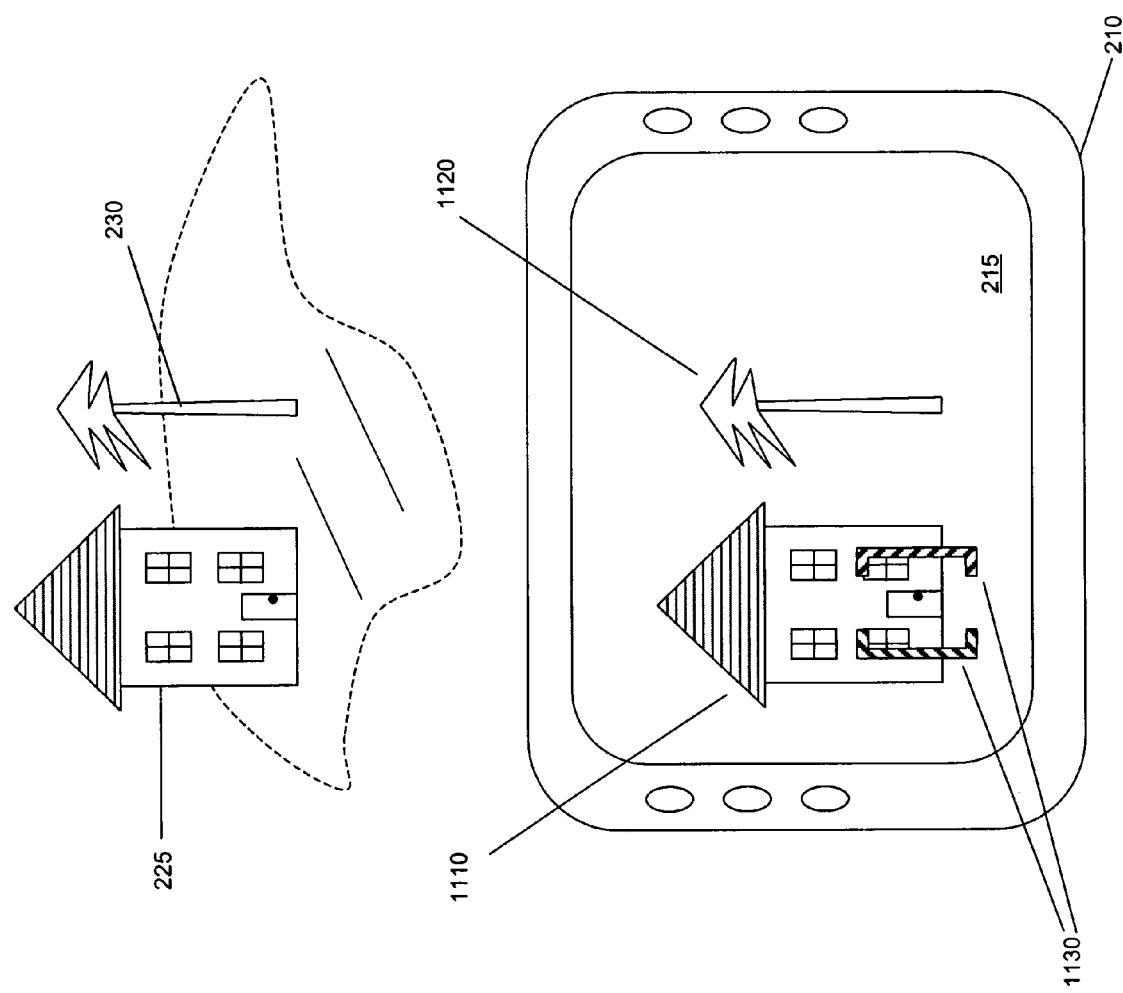
FIG. 11 shows a synthetic vision device used to visualize a direct real world view from a user's actual position. A reticle symbol is used to designate an object in the view.

FIG. 11 shows a synthetic vision device used to visualize a direct real world view from a user's actual position. A reticle symbol is used to designate an object in the view. In the figure synthetic vision device 210 is pointed toward a house 225 and a tree 230. Images 1110 and 1120 of the house and tree respectively appear on screen 215. Also shown on the screen is a reticle symbol 1130. The symbol is used to designate an object in the view. In this case a user has designated the door by placing the reticle symbol over the image of the door 1110. The device 210 remembers where the reticle is based on its three dimensional position coordinates.

Figure 12:
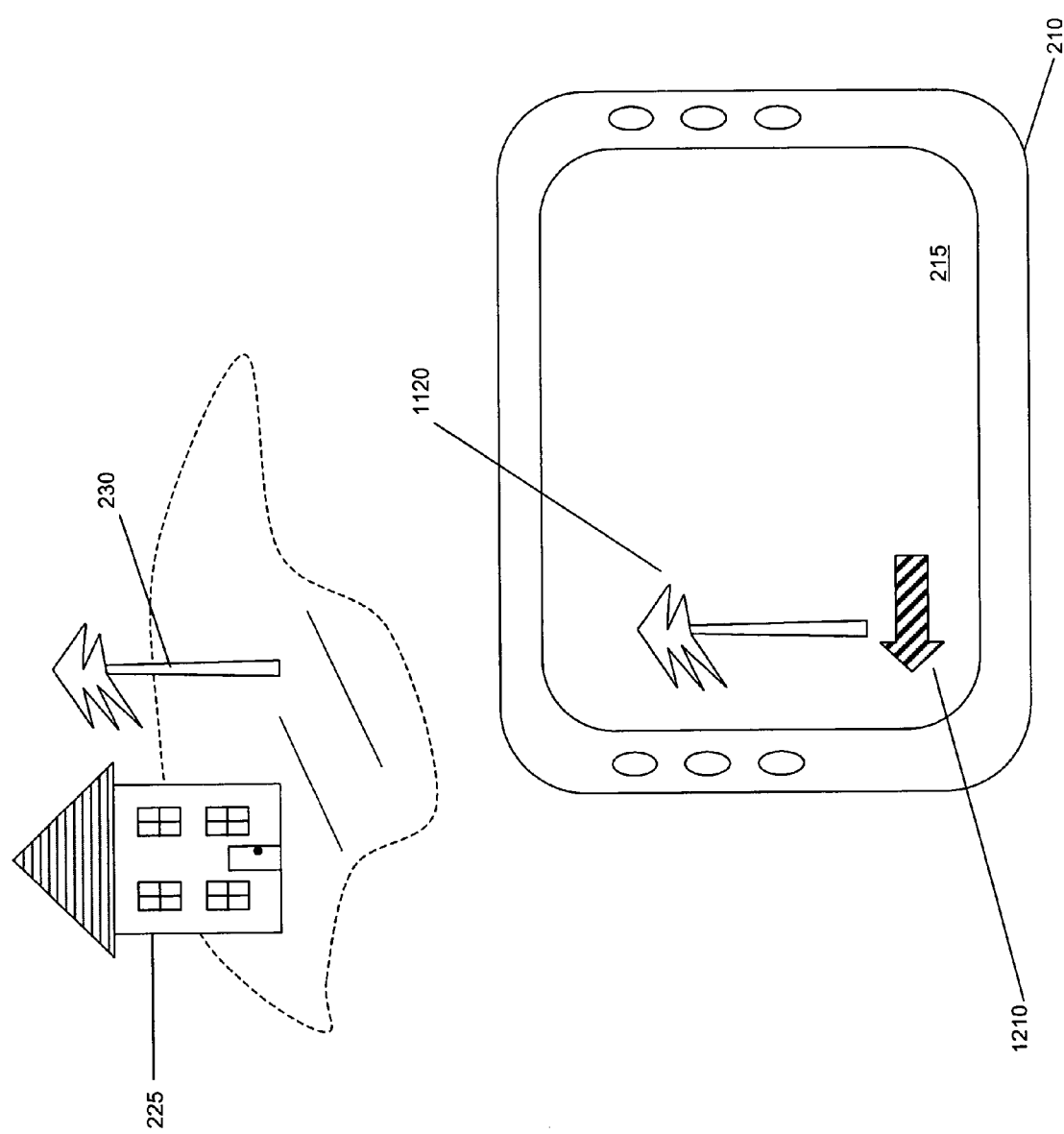
FIG. 12 shows a synthetic vision device used to visualize a direct real world view from a user's actual position. An arrow symbol is used to designate the direction in which the device must be pointed to see the reticle which was visible in the view shown in FIG. 11.

FIG. 12 shows a synthetic vision device used to visualize a direct real world view from a user's actual position. An arrow symbol is used to designate the direction in which the device must be pointed to see the reticle which was visible in the view shown in FIG. 11. In FIG. 12 the device 210 has been turned to the right compared to the view in FIG. 11. In FIG. 12 only the image 1120 of the tree 230 appears on screen. The house 225 is off screen to the left because the device is not pointed at it. However, arrow 1210 indicates the direction in which the device must be rotated to bring reticle symbol 1130 into view.

Reticle symbols which may be attached to three dimensional objects or positions in space and arrows that show where reticles lie when they are off screen offer a powerful methodology for users to mark items of interest and return to them. The reticle symbol may be drawn fairly large to reduce the visual impact of its possible mis-registration. It is sufficient for many users if the reticle provides a guide as to where to look on screen to find an object. Often it is not necessary for the reticle to lie exactly in the "right" place since a human observer can quickly distinguish what the reticle designates.

As one skilled in the art will readily appreciate from the disclosure of the present invention, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

While the invention has been described in connection with what are presently considered to be the most practical and preferred embodiments, it is to be understood that the invention is not limited to the disclosed embodiments and alternatives set forth above, but on the contrary is intended to cover various modifications and equivalent arrangements included within the scope of the following claims.

What is claimed is:

1. A synthetic vision system comprising:
a video imagery source configured to acquire and supply a real-time actual image;
a synthetic vision database having graphic objects stored therein;
a handheld unit;
a sensor suite housed within the handheld unit, the sensor suite comprising position and attitude sensors for reporting position and attitude data, respectively;
a display housed within the handheld unit and configured to render images of actual or digitally created scenes; and
a computer housed within the handheld unit and in communication with the video imagery source, the synthetic vision database, the sensor suite, and the display, the computer configured to:
(i) receive the position and attitude data from the sensor suite and compute a view frustum,
(ii) selectively retrieve graphic objects from the synthetic vision database,
(iii) command the display to render, in three dimensional perspective, an image of (a) the real-time actual image that lies wholly or partially within the view frustum and (b) graphic objects selectively retrieved from the synthetic vision database that lie wholly or partially within the view frustum,
wherein the image is rendered on the display with an expanded field of view, the expanded field of view being wider than a user field of view when the user is holding the handheld unit and looking at the image on the display.

2. The system of claim 1, wherein:
the computer updates the display at least 12 times per second; and
position data RMS accuracy is 15 meters or better with 95% confidence.

3. The system of claim 1, further comprising:
an input device in communication with the computer and housed in the handheld unit, the input device for allowing a user to select a plurality of viewpoints of the image rendered on the display.

4. The system of claim 1, wherein the computer implements sensor fusion, Kalman filtering, or display smoothing algorithms to enhance image quality when slow or asynchronous data are received from the sensor suite or the video imagery source.

5. The system of claim 1, wherein the computer is further configured to:
selectively render a reticle symbol to designate an object in the image; and
selectively render an arrow to indicate a direction in which to move the handheld unit, when the designated object is not visible in the image, in order to have the designated object once again visible in the image.

6. The system of claim 1, further comprising:
an external communication device in communication with the computer and configured to selectively communicate with one or more external devices.

7. A synthetic vision system comprising:
a handheld unit;
a sensor suite housed within the handheld unit, the sensor suite comprising position and attitude sensors for reporting position and attitude data, respectively, and a range finder for detecting and measuring distances to objects and reporting measured distance data;

a display housed within the handheld unit and configured to render actual or digitally created scenes; and a computer housed within the handheld unit and in communication with the sensor suite and the display, the computer configured to (i) receive the position data, the attitude data, and the measure distance data from the sensor suite, (ii) compute a view frustum, (iii) compare computed distances to the detected objects with the distances measured by the range finder, and (iv) command the display to render, in three dimensional perspective, an image of actual or digitally created scenes that lie wholly or partially within the view frustum, wherein:

the image includes the detected objects, and the detected objects are rendered in styles that indicate their relative distances.

8. The system of claim 7, wherein:

the computer updates the display at least 12 times per second; and position data RMS accuracy is 15 meters or better with 95% confidence.

9. The system of claim 7, further comprising:

an input device in communication with the computer and housed in the handheld unit, the input device for allowing a user to select a plurality of viewpoints of the image rendered on the display.

10. The system of claim 7, wherein the computer implements sensor fusion, Kalman filtering, or display smoothing algorithms to enhance image quality when slow or asynchronous data are received from the sensor suite.

11. The system of claim 7, wherein the computer is further configured to:

selectively render a reticle symbol to designate an object in the image; and selectively render an arrow to indicate a direction in which to move the handheld unit, when the designated object is not visible in the image, in order to have the designated object once again visible in the image.

12. The system of claim 7, further comprising:

an external communication device in communication with the computer and configured to selectively communicate with one or more external devices.

* * * * *